US012663330B2

(12) United States Patent
Wotus

(10) Patent No.: US 12,663,330 B2
(45) Date of Patent: Jun. 23, 2026

(54) ADDITIVE INFLATABLE LEAK CHECK BLADDER

(71) Applicant: RTX Corporation, Farmington, CT (US)

(72) Inventor: Justin Byer Wotus, Vernon, CT (US)

(73) Assignee: RTX Corporation, Farmington, CT (US)

( * ) Notice: Subject to any disclaimer, the term of this patent is extended or adjusted under 35 U.S.C. 154(b) by 287 days.

(21) Appl. No.: 18/506,574

(22) Filed: Nov. 10, 2023

(65) Prior Publication Data

US 2025/0155312 A1      May 15, 2025

(51) Int. Cl.
| | |
|---|---|
| *G01M 3/02* | (2006.01) |
| *F01D 21/00* | (2006.01) |
| *F16L 55/128* | (2006.01) |
| *F16L 55/134* | (2006.01) |
| *F01D 5/00* | (2006.01) |
| *F01D 25/28* | (2006.01) |
| *G01M 3/00* | (2006.01) |
| *G01M 3/04* | (2006.01) |
| *G01M 3/26* | (2006.01) |
| *G01M 3/36* | (2006.01) |

(52) U.S. Cl.
CPC ........... *G01M 3/025* (2013.01); *F01D 21/003* (2013.01); *F16L 55/1283* (2013.01); *F16L 55/134* (2013.01); *G01M 3/022* (2013.01); *F01D 5/005* (2013.01); *F01D 25/285* (2013.01); *F05D 2300/431* (2013.01); *F05D 2300/501* (2013.01); *G01M 3/005* (2013.01); *G01M 3/04* (2013.01); *G01M 3/26* (2013.01); *G01M 3/36* (2013.01)

(58) Field of Classification Search
CPC ........ G01M 3/00; G01M 3/025; G01M 3/022; G01M 3/005; G01M 3/04; G01M 3/26; G01M 3/36; F16L 55/1283; F16L 55/134; F01D 21/003; F01D 5/005; F01D 25/285; F05D 2300/431; F05D 2300/501
See application file for complete search history.

(56) References Cited

U.S. PATENT DOCUMENTS

| | | | |
|---|---|---|---|
| 5,510,078 A * | 4/1996 | Smith ................. | F16L 55/1651 264/269 |
| 6,619,109 B1 | 9/2003 | Dailey et al. | |

(Continued)

FOREIGN PATENT DOCUMENTS

KR      20230063108 A      5/2023

OTHER PUBLICATIONS

Extended European Search Report from European Patent application 24211921.2 dated Apr. 4, 2025, 9 pages.

*Primary Examiner* — Benjamin R Schmitt
(74) *Attorney, Agent, or Firm* — Kinney & Lange, P.A.

(57) ABSTRACT

A conformal sealing fixture includes an inflatable bladder having a bladder body, a sealing surface, and an intake port. The bladder body has an outer skin surrounding a hollow inner volume, which is configured to expand to a rigid or semi-rigid structure when in an inflated state and to collapse to a flaccid structure when in a deflated state. The sealing surface is configured to form a leak-tight seal against a port in a component assembly. The intake port is configured to direct a pressurizing fluid into and out of the hollow inner volume of the bladder body to inflate the bladder to the inflated state and deflate the bladder body to the deflated state.

15 Claims, 3 Drawing Sheets

(56) References Cited

U.S. PATENT DOCUMENTS

| | | | |
|---|---|---|---|
| 11,149,640 | B2 | 10/2021 | Freeman et al. |
| 2017/0322102 | A9 | 11/2017 | Parker et al. |
| 2020/0300723 | A1 | 9/2020 | Pergantis et al. |
| 2023/0256668 | A1 | 8/2023 | Nishida et al. |

* cited by examiner

ADDITIVE INFLATABLE LEAK CHECK BLADDER

The present disclosure relates generally to leak checks in constrained spaces and, more particularly, to an approach for sealing a component assembly in a constrained space in order to perform a leak check.

Component assemblies, including but not limited to brazed component assemblies, are commonly used in a variety of industrial applications including, but not limited to, gas turbine engine applications. To be useful, joints in component assemblies must be leak-free to permit select fluids, including liquids and gases, to flow through the component assemblies without leaking. To ensure leak-free joints, including but not limited to brazed joints, in component assemblies, component assemblies are typically leak checked after fabrication. A typical leak check includes sealing all openings in the component assembly and filling the component assembly with a pressurized fluid, e.g., water, air, nitrogen, or another fluid, and determining whether the sealed and pressurized component assembly will hold pressure. Alternately, the leak check can be conducted with a vacuum to determine whether the sealed and evacuated component assembly will hold a vacuum. Component assemblies are typically sealed with conventional sealing means including stoppers, bungs, and other sealing means know in the art. In some applications, though, component assemblies may be positioned in a physically and/or geometrically constrained space in a larger assembly that makes it difficult or impossible to seal openings in the component assemblies using conventional means.

SUMMARY

One aspect of this disclosure is a conformal sealing fixture including an inflatable bladder. The inflatable bladder includes a bladder body, a sealing surface, and an intake port. The bladder body has an outer skin surrounding a hollow inner volume. The bladder body is formed from an elastomeric material such that the bladder body is configured to expand to a rigid or semi-rigid structure when in an inflated state and to collapse to a flaccid structure when in a deflated state. The sealing surface is configured to form a leak-tight seal against a port in a component assembly. The intake port is configured to direct a pressurizing fluid into and out of the hollow inner volume of the bladder body to inflate the bladder to the inflated state and deflate the bladder body to the deflated state. The bladder body is configured to be positioned within a constrained space in an industrial assembly when the bladder body is in the deflated state and is configured to conform to a geometry of the constrained space when the bladder body is in the inflated state, such that when the bladder body is in the inflated state, the sealing surface engages with the port in the component assembly to form a leak-tight seal.

Another aspect of this disclosure is a method of leak checking a component assembly positioned in an industrial assembly. An inflatable bladder is inserted into a constrained space of the industrial assembly while the inflatable bladder is in a deflated state. The inflatable bladder is inflated to a rigid or semi-rigid inflated state by directing a pressurizing fluid through an intake port in the inflatable bladder into a hollow inner volume of a bladder body, causing the inflatable bladder to conform to a geometry of the constrained space and causing a sealing surface of the inflatable bladder to engage with a port in the component assembly to form a leak-tight seal. A leak check test is conducted on the component assembly. The inflatable bladder is deflated by evacuating the pressurizing fluid from the intake port in the inflatable bladder, causing the inflatable bladder to enter a flaccid deflated state and the inflatable bladder is removed from the constrained space of the industrial assembly.

DETAILED DESCRIPTION

Component assemblies, including but not limited to brazed component assemblies, are typically leak checked after fabrication to ensure they can effectively perform their function as conduits for various fluids. Many different leak check procedures are known in the art. Typically, such procedures include sealing all openings in the component assembly and filling the component assembly with a pressurized fluid, e.g., water, air, nitrogen, or another fluid, and determining whether the sealed and pressurized component assembly will hold pressure. Alternately, the leak check can be conducted with a vacuum to determine whether the sealed and evacuated component assembly will hold a vacuum. Component assemblies are typically sealed with conventional sealing means including plugs, stoppers, bungs, and other sealing means know in the art. However, in some applications, component assemblies may be positioned in a physically and/or geometrically constrained space in a larger assembly that makes it difficult or impossible to seal openings in the component assemblies using conventional means to conduct the leak check.

Figures 1A, 1B:
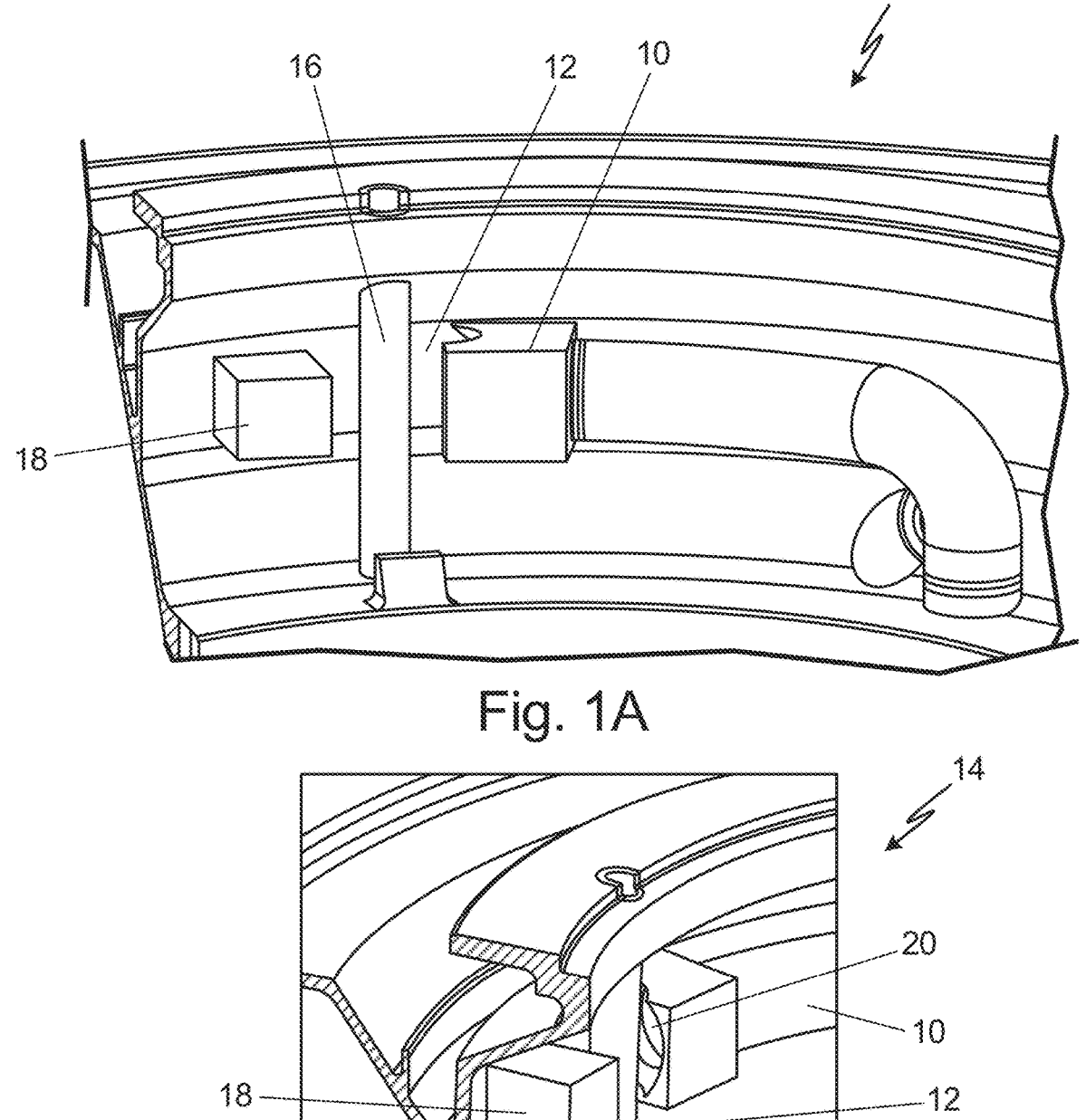
FIG. 1A is a view of an interior portion of a gas turbine engine assembly.
FIG. 1B is another view of the interior portion of the gas turbine engine assembly of FIG. 1A.

FIGS. 1A and 1B show an exemplary environment in which a component assembly 10 is positioned in a constrained space 12 that forms part of a larger industrial assembly 14. The industrial assembly 14 can be any of a number of industrial products that incorporate a component assembly 10. For example, the industrial assembly 14 can be part of a gas turbine engine as shown in FIGS. 1A and 1B or some other industrial assembly. As depicted in FIGS. 1A and 1B, the constrained space 12 can include one or more interior structures 16, 18 that can obstruct access to the component assembly 10, particularly to a port 20 in the component assembly 10. The interior structures 16, 18 depicted in FIGS. 1A and 1B are examples of interior structures 16, 18 that can obstruct access to the component assembly 10 and are not meant to be limiting. A person of ordinary skill will understand that many other types and shapes of interior structures positioned in a constrained space of an industrial structure could obstruct access to a component assembly. As seen in FIGS. 1A and 1B, the positioning of the interior structures 16, 18 in the constrained space 12 makes it difficult or impossible to seal the port 20 in the component assembly 10 so than the component assembly 10 can be leak checked.

Figure 2:
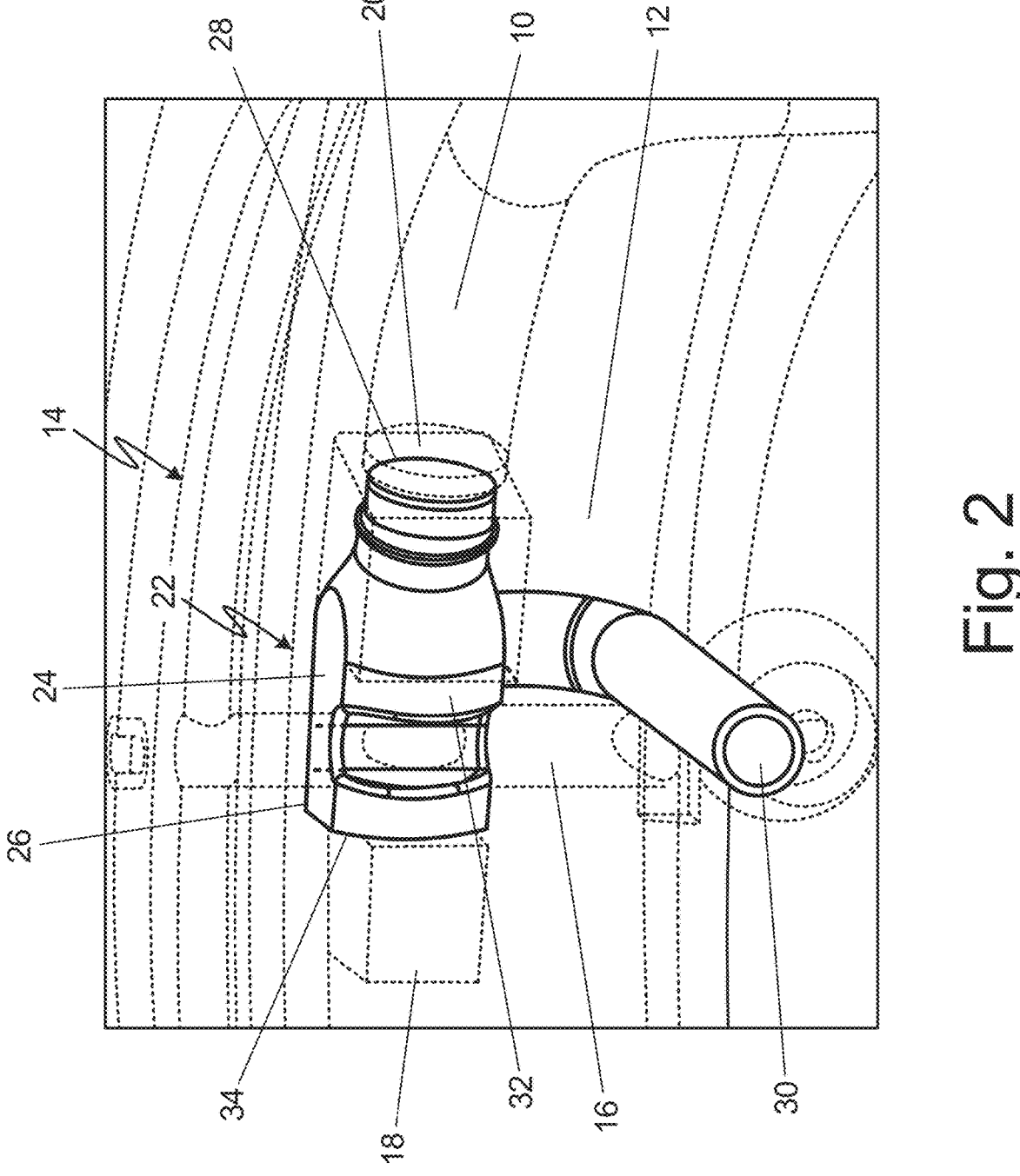
FIG. 2 is an isometric view an inflatable leak check bladder of this disclosure positioned in the interior portion of the gas turbine engine assembly of FIGS. 1A and 1B.

FIG. 2 shows a conformal sealing fixture 22 configured to seal a port 20 in the component assembly 10. The conformal sealing fixture 22 includes an inflatable bladder 24 with a bladder body 26, a sealing surface 28, and an intake port 30. The bladder body 26 has an outer skin 32 surrounding a hollow inner volume (not shown directly). The bladder body 26 is formed from an elastomeric material such that the bladder body is configured to expand to a rigid or semi-rigid structure when in an inflated state and to collapse to a flaccid structure when in a deflated state. The sealing surface 28 is configured to form a leak-tight seal against the port 20 in the component assembly 10. The intake port 30 is configured to direct a pressurizing fluid into and out of the hollow inner volume of the bladder body to inflate the bladder to the inflated state and deflate the bladder body to the deflated state.

The bladder body 26 is configured to be positioned within the constrained space 12 in the industrial assembly 14 when the bladder body 26 is in the deflated state. As shown in FIG. 2, the bladder body 26 is configured to conform to the geometry of the constrained space 12 when the bladder body is in the inflated state. In this example, the bladder body 26 is structure to fit between interior structure 18 and the component assembly 10 and to surround partially interior structure 16. Optionally, the bladder body 26 can include a support face 34 that is configured to fit against an interior structure, such as interior structure 18, to stabilize and support the conformal sealing fixture 22 in the constrained space 12. Additionally, the bladder body 26 can be sized to provide a tight fit in the constrained space 12 when the bladder body 26 is in its inflated state also to stabilize and support the conformal sealing fixture 22 in the constrained space 12. As discussed further below, the outer skin 32 can be constructed with selected friction characteristics as an additional measure to stabilize and support the conformal sealing fixture 22 in the constrained space 12. When the bladder body 26 is in its inflated state, the sealing surface 28 engages with the port 20 in the component assembly 10 to form a leak-tight seal that will support a leak check test on the component assembly 10.

Figures 3A, 3B, 3C:
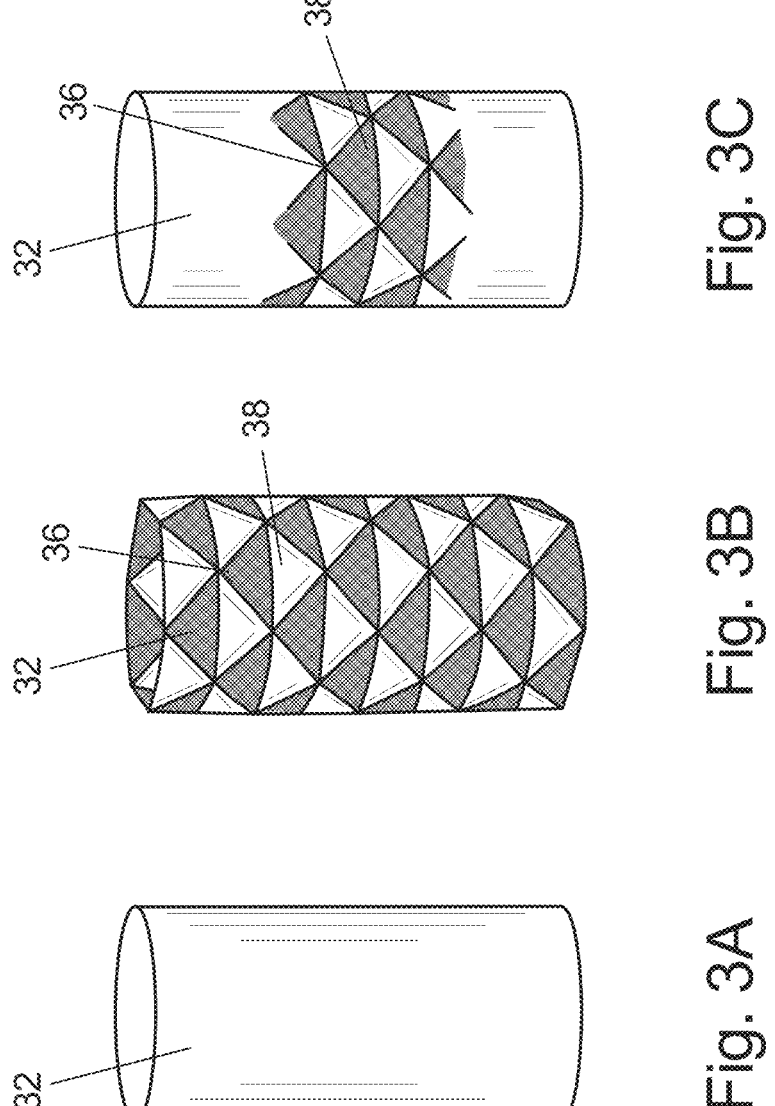
FIGS. 3A to 3C are alternate views of the skin of the leak check bladder of FIG. 2 showing a smooth skin (FIG. 3A), a skin with an isogrid structure (FIG. 3B), and a skin with a partial isogrid structure (FIG. 3C).

While the outer skin 32 of bladder body 26 is shown in FIG. 2 (see also FIG. 3A) with a smooth surface, it is also possible to form the outer skin 32 with an isogrid structure 36, shown in FIGS. 3B and 3C, on all (FIG. 3B) or some (FIG. 3C) of the outer skin 32. As known, an isogrid structure 36 is a partially hollowed-out thin skin reinforced with a lattice structure having triangular integral stiffening ribs 38, sometimes called stringers. The isogrid structure 36 permits the bladder body 26 to contract and inflate like an accordion. When inflated, the isogrid's triangular pattern retains rigidity with less material than non-isogrid structures, thereby saving material and weight.

The conformal sealing fixture 22 is formed of an elastomeric material to allow it to inflate to an inflated state and deflate to a deflated state. The elastomeric material can be any material capable of inflating to form a leak-tight seal when the sealing surface 28 engages with the port 20 in the component assembly 10. For example, the elastomeric material can be natural rubber, artificial rubber, polyurethane, silicone rubber, or any other suitable elastomer. If the conformal sealing fixture is made with an additive manufacturing method as discussed below, the elastomeric material can be a light-curable resin useful in a stereo lithography process. The elastomeric material can be selected to impart desirable friction characteristics to the outer skin 32 to stabilize and support the conformal sealing fixture 22 in the constrained space 12.

The conformal sealing fixture 22 can be made with any method capable of forming a bladder body 26 having an outer skin 32 surrounding a hollow inner volume, which could be described as a shaped, balloon-like structure. For example, additive manufacturing techniques such as vat photopolymerization (e.g., stereolithography or other techniques known as vat photopolymerization) or material jetting can be used to create the bladder body 26 with the desired geometry and mechanical properties. In one option, the outer skin 32 can be formed from an elastomeric material as discussed above with a soluble resin used to form an interior space between the outer skin 32. The soluble resin can be any material can be dissolved or washed out of the bladder body 26 after it is formed to create the hollow inner volume surrounded by the outer skin 32. As discussed some or all of the outer skin 32 can be formed with an isogrid structure 36 as deemed appropriate for a particular application of the bladder.

The conformal sealing fixture 22 described above will reduce time to provide a seal to leak check a component assembly 10 that is positioned in constrained space 12 and eliminate multi-part complex fixtures and seals. The conformal sealing fixture 22 also has built in mistake-proofing due to the bladder body 26 being conformal to geometry of the constrained space 12 in which it is intended to be used.

Discussion of Possible Embodiments

The following are non-exclusive descriptions of possible embodiments of the present invention.

A conformal sealing fixture comprising an inflatable bladder having a bladder body having an outer skin surrounding a hollow inner volume, a sealing surface, and an intake port configured to direct a pressurizing fluid into and out of the hollow inner volume of the bladder body to inflate the bladder to the inflated state and deflate the bladder body to the deflated state. The bladder body is formed from an elastomeric material such that the bladder body is configured to expand to a rigid or semi-rigid structure when in an inflated state and to collapse to a flaccid structure when in a deflated state. The sealing surface is configured to form a leak-tight seal against a port in a component assembly. The bladder body is configured to be positioned within a constrained space in an industrial assembly when the bladder body is in the deflated state and is configured to conform to a geometry of the constrained space when the bladder body is in the inflated state, such that when the bladder body is in the inflated state, the sealing surface engages with the port in the component assembly to form a leak-tight seal.

The conformal sealing fixture of the preceding paragraph can optionally include, additionally and/or alternatively, any one or more of the following features, configurations and/or additional elements:

The conformal sealing fixture of the preceding paragraph, wherein at least a portion of the outer skin comprises an isogrid structure.

The conformal sealing fixture of any of the preceding paragraphs, wherein the elastomeric material is selected from the group consisting of natural rubber, artificial rubber, polyurethane, and silicone rubber.

The conformal sealing fixture of any of the preceding paragraphs, wherein the elastomeric material is a light-curable resin useful in a stereo lithography process.

The conformal sealing fixture of any of the preceding paragraphs, wherein the component assembly is configured to operate as a fluid conduit in the industrial assembly.

The conformal sealing fixture of any of the preceding paragraphs, wherein the constrained space includes one or more interior structures that impede access to the port in the component assembly.

The conformal sealing fixture of any of the preceding paragraphs, wherein the industrial assembly is a structure of a gas turbine engine.

A method of leak checking a component assembly positioned in an industrial assembly, comprising the steps of inserting an inflatable bladder into a constrained space of the industrial assembly, wherein the inflatable bladder is in a deflated state; inflating the inflatable bladder to a rigid or semi-rigid inflated state by directing a pressurizing fluid through an intake port in the inflatable bladder into a hollow inner volume of a bladder body, thereby causing the inflatable bladder to conform to a geometry of the constrained space and causing a sealing surface of the inflatable bladder to engage with a port in the component assembly to form a leak-tight seal; conducting a leak check test on the component assembly; deflating the inflatable bladder by evacuating the pressurizing fluid from the intake port in the inflatable bladder, thereby causing the inflatable bladder to enter a flaccid deflated state; and removing the inflatable bladder from the constrained space of the industrial assembly.

The method of the preceding paragraph can optionally include, additionally and/or alternatively, any one or more of the following features, configurations and/or additional elements:

The method of the preceding claim, wherein the bladder body includes an outer skin that defines the hollow inner volume of the bladder body.

The method of the preceding claim, wherein at least a portion of the outer skin comprises an isogrid structure.

The method of any of the preceding claims, wherein the bladder body is formed from an elastomeric material such that the bladder body is configured to expand to a semi-rigid structure when in an inflated state and to collapse to a flaccid structure when in a deflated state.

The method of the preceding claim, wherein the elastomeric material is selected from the group consisting of natural rubber, artificial rubber, polyurethane, and silicone rubber.

The method of the preceding claim, wherein the elastomeric material is a light-curable resin useful in a stereo lithography process.

The method of any of the preceding claims, wherein the component assembly is configured to operate as a fluid conduit in the industrial assembly.

The method of any of the preceding claims, wherein the constrained space includes one or more interior structures that impede access to the port in the component assembly.

The method of any of the preceding claims, wherein the industrial assembly is a structure of a gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A conformal sealing fixture for a component assembly positioned in an industrial assembly comprising:
   an inflatable bladder having:
      a bladder body having an outer skin surrounding a hollow inner volume, wherein the bladder body is formed from an elastomeric material such that the bladder body is configured to expand to a rigid or semi-rigid structure when in an inflated state and to collapse to a flaccid structure when in a deflated state and wherein at least a portion of the outer skin comprises an isogrid structure;
      a sealing surface, wherein the sealing surface is configured to form a leak-tight seal against a port in the component assembly; and
      an intake port configured to direct a pressurizing fluid into and out of the hollow inner volume of the bladder body to inflate the bladder to the inflated state and deflate the bladder body to the deflated state;
   wherein the bladder body is configured to be positioned within a constrained space in the industrial assembly when the bladder body is in the deflated state and is configured to conform to a geometry of the constrained space when the bladder body is in the inflated state, such that when the bladder body is in the inflated state, the sealing surface engages with the port in the component assembly to form a leak-tight seal.

2. The conformal sealing fixture of claim 1, wherein the elastomeric material is selected from the group consisting of natural rubber, artificial rubber, polyurethane, and silicone rubber.

3. The conformal sealing fixture of claim 2, wherein the elastomeric material is a light-curable resin useful in a stereo lithography process.

4. The conformal sealing fixture of claim 1, wherein component assembly is configured to operate as a fluid conduit in the industrial assembly.

5. The conformal sealing fixture of claim 1, wherein the constrained space includes one or more interior structures that impede access to the port in the component assembly.

6. The conformal sealing fixture of claim 1, wherein the industrial assembly is a structure of a gas turbine engine.

7. The conformal sealing fixture of claim 1, wherein the elastomeric material is a light-curable resin that is selected to impart desirable friction characteristics to the outer skin to stabilize and support the conformal sealing fixture in the constrained space.

8. A method of leak checking a component assembly positioned in an industrial assembly, comprising the steps of:
   inserting an inflatable bladder into a constrained space of the industrial assembly, wherein the inflatable bladder is in a deflated state;
   inflating the inflatable bladder to a rigid or semi-rigid inflated state by directing a pressurizing fluid through an intake port in the inflatable bladder into a hollow inner volume of a bladder body, thereby causing the inflatable bladder to conform to a geometry of the constrained space and causing a sealing surface of the inflatable bladder to engage with a port in the component assembly to form a leak-tight seal;
   conducting a leak check test on the component assembly, wherein the bladder body includes an outer skin that defines the hollow inner volume of the bladder body and at least a portion of the outer skin comprises an isogrid structure;

deflating the inflatable bladder by evacuating the pressurizing fluid from the intake port in the inflatable bladder, thereby causing the inflatable bladder to enter a flaccid deflated state; and removing the inflatable bladder from the constrained space of the industrial assembly.

9. The method of claim 8, wherein the bladder body is formed from an elastomeric material such that the bladder body is configured to expand to a semi-rigid structure when in an inflated state and to collapse to a flaccid structure when in a deflated state.

10. The method of claim 9, wherein the elastomeric material is selected from the group consisting of natural rubber, artificial rubber, polyurethane, and silicone rubber.

11. The method of claim 10, wherein the elastomeric material is a light-curable resin useful in a stereo lithography process.

12. The method of claim 9, wherein the elastomeric material is selected to impart desirable friction characteristics to the outer skin to stabilize and support the conformal sealing fixture in the constrained space.

13. The method of claim 8, wherein the component assembly is configured to operate as a fluid conduit in the industrial assembly.

14. The method of claim 8, wherein the constrained space includes one or more interior structures that impede access to the port in the component assembly.

15. The method of claim 8, wherein the industrial assembly is a structure of a gas turbine engine.

* * * * *